United States Patent
Kuse et al.

(10) Patent No.: US 10,498,453 B2
(45) Date of Patent: Dec. 3, 2019

(54) INTEGRATED PHOTONIC MICROWAVE TRANSCEIVER SYSTEM

(71) Applicant: IMRA America, Inc., Ann Arbor, MI (US)

(72) Inventors: Naoya Kuse, Longmont, CO (US); Antoine Jean Gilbert Rolland, Longmont, CO (US); Yihan Li, Boulder, CO (US); Martin E. Fermann, Dexter, MI (US)

(73) Assignee: IMRA America, Inc., Ann Arbor, MI (US)

(*) Notice: Subject to any disclaimer, the term of this patent is extended or adjusted under 35 U.S.C. 154(b) by 0 days.

(21) Appl. No.: 16/038,644

(22) Filed: Jul. 18, 2018

(65) Prior Publication Data
US 2019/0028203 A1    Jan. 24, 2019

Related U.S. Application Data

(60) Provisional application No. 62/535,470, filed on Jul. 21, 2017, provisional application No. 62/583,963, filed on Nov. 9, 2017.

(51) Int. Cl.
| | |
|---|---|
| H04B 10/524 | (2013.01) |
| H04B 10/548 | (2013.01) |
| G02F 3/00 | (2006.01) |
| H04J 14/02 | (2006.01) |
| H04B 10/50 | (2013.01) |

(52) U.S. Cl.
CPC ............ *H04B 10/505* (2013.01); *G02F 3/00* (2013.01); *H04B 10/548* (2013.01); *H04J 14/02* (2013.01); *G02F 2203/56* (2013.01)

(58) Field of Classification Search
None
See application file for complete search history.

(56) References Cited

U.S. PATENT DOCUMENTS

| | | | |
|---|---|---|---|
| 2014/0064734 A1* | 3/2014 | Witzens ............... | H04B 10/64 398/79 |
| 2018/0006730 A1* | 1/2018 | Kuo ..................... | H04B 10/615 |

OTHER PUBLICATIONS

Anderson et al. ("Advanced Channelization Technology for RF Microwave, and Millimeterwave Applications"; Proceedings of the IEEE, vol. 79, No. 3, Mar. 1991, pp. 355-388). (Year: 1991).*

(Continued)

*Primary Examiner* — Michelle R Connelly
(74) *Attorney, Agent, or Firm* — Knobbe, Martens, Olson & Bear, LLP

(57) ABSTRACT

Examples of systems and methods for integrated photonic broadband microwave transceivers are disclosed based on integrated coherent dual optical frequency combs. In some cases, when the system is configured as a transmitter, multiple radio frequency (RF) carriers can be generated, which can either be encoded independently, or used for broadcasting the same information into different bands. In some cases, when the system is configured as a receiver, the spectrum of the input signal can be sliced into several spectral segments for low-bandwidth detection and analysis. In some systems, the optics-related functionalities can be achieved via integrated optic technology, for example based on silicon photonics, providing tremendous possibilities for mass-production with significantly reduced system footprint.

28 Claims, 14 Drawing Sheets

(56) References Cited

OTHER PUBLICATIONS

L. Alloatti et al., "100 GHz silicon—organic hybrid modulator", Light: Science & Applications, May 2014, vol. 3, e173, in 4 pages.
S. Cheung et al., "Low-loss and high contrast silicon-on-insulator (SOI) arrayed waveguide grating", in Proc. Conf. Lasers Electro-Opt., CLEO: science and innovations, pp. CM4A-5, May 2012.
F. Laghezza et al., "Photonics-Assisted Multiband RF Transceiver for Wireless Communications," J. Lightwave Technol., vol. 32, No. 16, pp. 2896-2904, Aug. 2014.
R. Li et al. 'Multiple-frequency measurement based on serial photonics channelization using optical wavelength scanning', Opt. Lett., vol. 38, No. 22, pp. 4781-4784, Nov. 2013.
P. Marin-Palomo et al., "Microresonator-based solitons for massively parallel coherent optical communications", Nature, vol. 546, pp. 274-279, Jun. 2017.
X. Xie et al., 'Broadband photonic RF channelization based on coherent optical frequency combs and I/Q demodulators', IEEE Photonics Journal, vol. 4, No. 4, pp. 1196-1202, Aug. 2012.

\* cited by examiner

INTEGRATED PHOTONIC MICROWAVE TRANSCEIVER SYSTEM

CROSS-REFERENCE TO RELATED APPLICATIONS

This application claims the benefit of priority to U.S. Provisional Application No. 62/535,470, filed Jul. 21, 2017, entitled INTEGRATED PHOTONIC MICROWAVE TRANSCEIVER SYSTEM, and to U.S. Provisional Patent Application No. 62/583,963, filed Nov. 9, 2017, entitled INTEGRATED PHOTONIC MICROWAVE TRANSCEIVER SYSTEM, each of which is hereby incorporated by reference herein in its entirety.

BACKGROUND

Field

The present disclosure relates generally to photonics systems and more particularly to an integrated microwave photonic transceiver system implementing coherent dual optical frequency combs and optical wavelength-division multiplexing.

Description of the Related Art

Radio frequency (RF) signal analyzers utilizing photonic channelization based on wavelength-division-multiplexing (WDM) have been developed. Time-division-multiplexing (TDM)-based microwave channelizers have also been developed. Such systems can have limitations.

SUMMARY

With the rapid development of broadband radio frequency technology comes the need for a compact transceiver system that generates multiple coherent microwave carriers for independent channel control and analyzes broadband input signals with fast acquisition speed, which can be extremely difficult for conventional techniques.

The present disclosure describes examples of microwave photonic systems adapted to the generation and detection of broadband RF signals. The systems can be configured to provide various functionalities including, but not limited to, microwave multi-carrier synthesis and independent data encoding, microwave multi-carrier information broadcasting, or broadband microwave spectral analysis. In at least some of the transceiver systems described herein, all of the optics-related functionalities of the devices can be achieved via the use of compact integrated optic devices, as for example based on silicon photonics, silica nitride or diamond microstructures, just to name a few examples, providing tremendous possibilities for mass production with significantly reduced system footprint.

In an example embodiment, output from a continuous wave (CW) laser at a carrier frequency $f_{cw}$ is split into two output arms via an optical beam splitter or coupler, generating a 1st and a 2nd output, respectively. The 1st output is transformed into an optical frequency comb (OFC1) with a comb spacing of f1 by an integrated optical comb generator comprising, for example, a 1st integrated electro-optical modulator (EOM), or a 1st integrated micro-ring resonator. The comb OFC1 is subsequently modulated by an electro-optical amplitude modulator (denoted $EOM^m$), which can be for example a Mach-Zehnder modulator (MZM), or a single-sideband carrier-suppressed modulator (SSCSM). When driven by an external RF signal, this modulator converts the input from the RF domain to the optical domain as side band(s) to each comb line of OFC1. The optical signal is then fed into a 1st wavelength-division de-multiplexer (WDM1), in which the optical spectrum is sliced into several segments, each with a unique frequency coverage. An electro-optical modulator (denoted $EOM^d$) is placed in each wavelength channel, which depending on the type of the modulator, delivers the functionality of altering the amplitude and/or the phase of the optical signal passing through.

In the example embodiment, the 2nd output of the CW laser is also transformed into an optical frequency comb, OFC2, with a detuned comb spacing f2 different than the comb spacing f1 of OFC1. This optical frequency comb can be generated in the same way as OFC1 by using integrated optical devices such as electro-optical modulators or a micro-ring resonator. The OFC2 output is then passing through an optical frequency shifter (OFS), which can for example include a single-sideband carrier suppressed electro-optical modulator (SSCSM) driven by a direct-digital synthesizer (DDS). This OFS enables a uniform spectral shift of each comb line of OFC2 according to the instantaneous frequency of the DDS output. Subsequently, the optical signal is fed into a second wavelength-division de-multiplexer (WDM2), whose frequency allocation can be the same as that of WDM1.

In an example embodiment, two wavelength channels of WDM1 and WDM2 having the same frequency allocation are combined by, for example, an optical coupler or a 90° optical hybrid. The combined optical signal is converted to the electrical domain by an optical-to-electrical convertor (OEC) such as a photodetector or a dual-input balanced photodetector. Optionally, an analog-to-digital convertor (ADC) is placed after the OEC for each wavelength channel, whose output is combined in a digital signal processing (DSP) unit for data acquisition and analysis.

In an example embodiment in which the microwave photonics system is configured as a microwave multi-carrier generator and independent data encoder, the comb spacings of the combs OFC1 (f1) and OFC2 (f2) are carefully chosen such that the generated microwave multiple carriers are separated by a desired increment $\Delta f=|f1-f2|$. The $EOM^m$ is operated in an "all-pass" state, which can be realized by, for example, turning off the driving electrical signal and biasing the modulator at the maximum transmission point, if applied. The OFS can be optionally operated at a driving frequency of $\delta f$, shifting the frequencies of the generated microwave carriers from $\Delta f$, $2\Delta f$, $3\Delta f$ ... $N\Delta f$ to $\Delta f+\delta f$, $2\Delta f+\delta f$, $3\Delta f+\delta f$ ... $N\Delta f+\delta f$, where N is the total number of WDM channels. A number of N independent input data streams can be encoded onto the synthesized N microwave carriers, through modulating the $EOM^d$s in the N wavelength channels of WDM2. The data modulation can be realized in the format of amplitude modulation (AM), frequency modulation (FM) or phase modulation (PM), depending on the type of $EOM^d$ utilized. Advanced modulation formats such as in-phase/quadrature I/Q modulation can also be used just to name an example.

In an example embodiment in which the microwave photonics system is configured as a microwave multi-carrier information broadcaster, the comb spacings of the combs OFC1 (f1) and OFC2 (f2) are carefully chosen such that the generated multiple microwave carriers are separated by the desired increment $\Delta f=|f1-f2|$. The information-to-broadcast is modulated to all the optical comb lines of OFC1 through the $EOM^m$. The OFS can be optionally operated at a driving frequency of $\delta f$, shifting the frequencies of the generated microwave carriers from Δf, 2Δf, 3Δf ... NΔf to Δf+δf, 2Δf+δf, 3Δf+δf ... NΔf+δf, where N is the total number of WDM channels. All the EOM$^d$s in the wavelength channels of WDM1 are set in the "all-pass" mode. The N outputs contains the same information, but with different microwave carrier frequencies.

In an example embodiment in which the microwave photonics system is configured as a broadband spectral analyzer/receiver, the comb spacings of the combs OFC1 (f1) and OFC2 (f2) are separated at a predetermined difference Δf=|f1−f2|. The broadband input RF signal is modulated to all optical comb lines of OFC1 through the EOM$^m$. The mismatch between the comb spacings of the two OFCs, in combination with the optical wavelength de-multiplexing, spectrally slices the input signal into N segments at a separation of Δf, where N is the total number of WDM channels. RF down-conversion is achieved by optical heterodyning of the segmented EOC1 sidebands and the comb lines of OFC2 at the OECs of the N WDM channels, enabling the detection of broadband microwave signals with low-bandwidth ADCs. In the case when the bandwidth (denoted BW) of the detection module is smaller than to Δf (e.g., Δf~k·BW, k is an integer), time-division multiplexing can be realized by programming an additional DDS with a waveform whose instantaneous frequency monotonously changes by the bandwidth BW for k steps. When such a waveform is used to drive the SSCSM in the OFS, comb lines of OFC2 are shifted periodically following the driving signal generated by the DDS. In this way, each WDM channel can be fully covered and analyzed in a sequential way.

In an example embodiment in which the microwave photonics system is configured as a transceiver, the system configurations of the multi-carrier generator and the broadband analyzer/receiver are combined, except that both systems start with the same dual optical frequency comb sources. This can be realized by further splitting the outputs of both optical frequency comb generators into two parts to feed the rest of the two sub-systems. Alternatively, the same configuration described in the example embodiment of the multi-carrier generator can be used as a transceiver, if the system is operated in an alternation between "transmit" and "receive" modes. In the "transmit" mode, the EOM$^m$ is set in the "all-pass" state and data streams are encoded into the generated multiple RF carriers through the EOM$^d$s. To switch to the "receive" mode, all EOM$^d$s are set in the "all-pass" mode and the received RF signal is fed into the system through the EOM$^m$.

The foregoing summary and the following drawings and detailed description are intended to illustrate non-limiting examples but not to limit the disclosure.

BRIEF DESCRIPTION OF THE DRAWINGS

FIG. 8b demonstrates an example result (time-domain measurement) obtained from an implementation of the broadband RF analyzer according to FIG. 8a.

FIG. 8c demonstrates an example result (frequency domain result after processing by a digital signal processor (DSP)) obtained from an implementation of the broadband RF analyzer according to FIG. 8a.

The figures depict various embodiments of the present disclosure for purposes of illustration and are not intended to be limiting. Wherever practicable, similar or like reference numbers or reference labels may be used in the figures and may indicate similar or like functionality.

DETAILED DESCRIPTION

Overview

Figure 1:
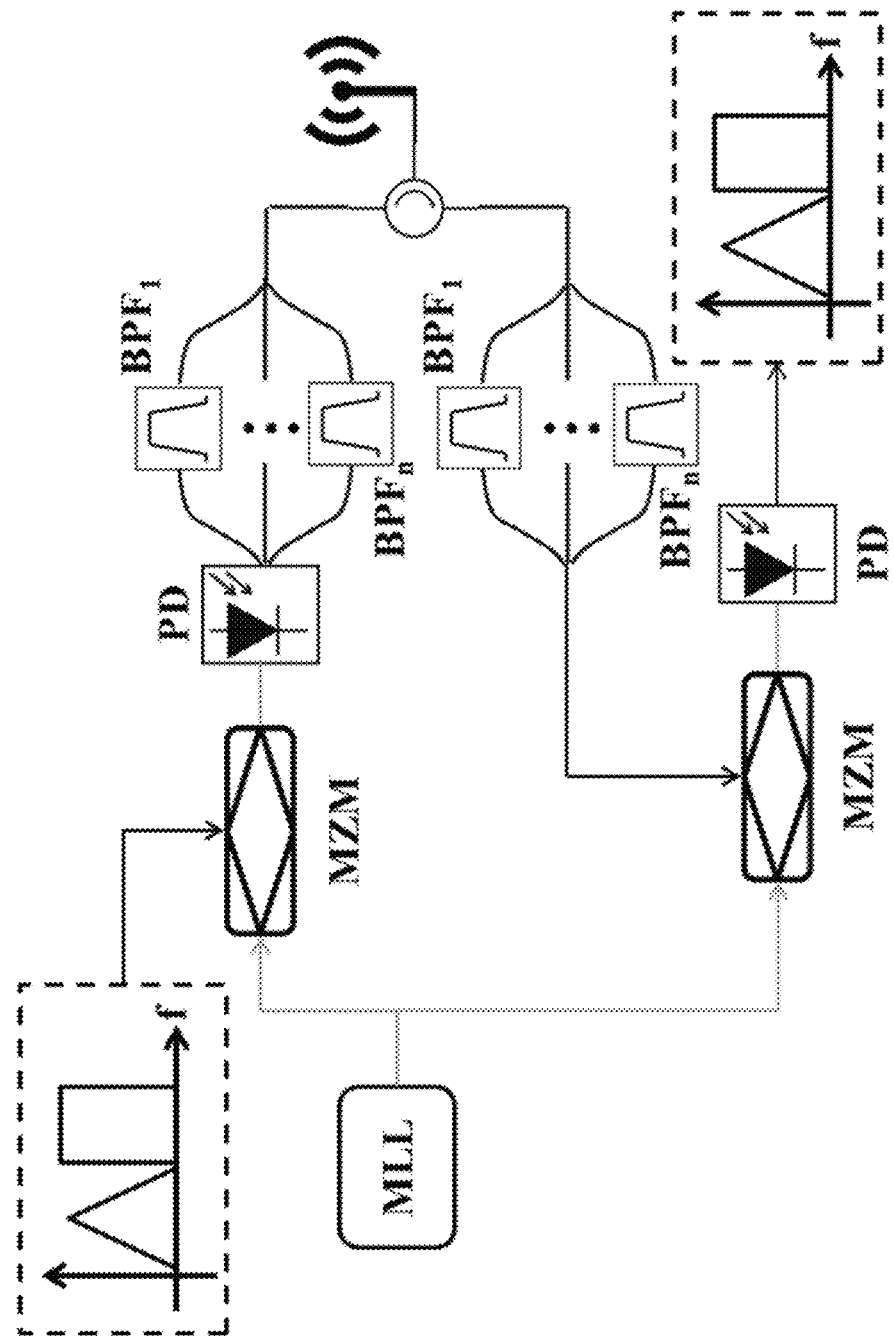
FIG. 1 shows an embodiment of a photonic microwave multiband transceiver system.

FIG. 1 schematically illustrates an embodiment of a photonic microwave transceiver based on F. Laghezza and et al., "Photonics-Assisted Multiband RF Transceiver for Wireless Communications," J. Lightwave Technol. 32, 2896-2904 (2014). On the transmitter end, the input radio frequency (RF) information is modulated into the optical domain by a Mach-Zehnder modulator (MZM) at the sidebands of each optical carrier of an optical source—a mode locked laser (MLL). Once this optical signal is transformed back to the RF domain through an optical-to-electrical convertor (OEC), for example a photodetector (PD), the sideband of a particular comb line heterodynes with its neighboring comb lines, effectively replicating the input RF information to multiple RF carrier frequencies, whose separation equals the repetition rate of the MLL. The output of the photodetector is split into multiple parts, each with an RF bandpass filter (BPF) to select a desired segment of the input RF information at the wanted RF carrier.

However, in this system, the frequency separation of the generated RF carriers is clamped to the comb spacing of the MLL, with minimal tuning ability. In addition, the data stream that is encoded onto the RF carriers cannot be altered independently and the bandwidth of each RF channel is restricted by the utilized RF bandpass filters. On the receiver end, a broadband microwave input signal is spectrally divided into several segments by the use of multiple RF bandpass filters. These segments are combined and modulated onto the same optical source of the transmitter and subsequently converted back to the RF domain by an optical-to-electrical converter. Thus the input signal is down-converted by integer multiples of the MLL comb spacing to the baseband, enabling detection using low-bandwidth analog-to-digital controllers (ADCs). However, ambiguity occurs in this detection scheme when the input signal contains two or more pieces of information that are separated by integer multiple of the MLL comb spacing. Such ambiguity can indeed be removed by sequentially detecting each bandpass-filtered RF channels, which is unfortunately prohibitively time-consuming in broadband applications. Moreover, both the transmitter and receiver contain bulky optical devices that have large footprints and high energy consumption, which can be a big hurdle for future mass-production.

A photonic RF signal receiver or analyzer utilizing photonic channelization based on wavelength-division-multiplexing (WDM) was for example discussed in X. Xie et al., 'Broadband photonic RF channelization based on coherent optical frequency combs and I/Q demodulators', IEEE Photonics Journal, vol. 4, No 4, 1196 (2012). In this configuration two optical combs, whose comb spacings are slightly detuned, are generated from the same continuous-wave (CW) laser. The signal under test (SUT) is modulated onto one of the combs. These two combs are then individually segmented into several channels by the optical wavelength division multiplexers according to the optical frequency. Channels with the same optical frequencies are subsequently mixed for balanced photo-detection. However, in broadband microwave applications, a large number of optical-to-electrical converters (OECs) and analog-to-digital conversion (ADC) modules are required as often times the signal under test needs to be separated into a significant number of channels. Moreover, the detection bandwidth of the OECs and ADC modules has to be essentially the same as the WDM channel bandwidth, which means that for typical WDM channel spacings as used in optical communication systems, e.g., 25 GHz, ADCs with at least a detection speed of 50 GS/s (GigaSamples per second) are required to fully analyze the signals. ADC converters operating at such large bandwidth are indeed prohibitively expense. Therefore, integration of such a system using integrated optic components would not be practical and was not considered.

In another system, to relax the requirement of the OECs and ADC modules, time-division-multiplexing (TDM)-based microwave channelizers were for example discussed in R. Li et al. 'Multiple-frequency measurement based on serial photonics channelization using optical wavelength scanning', Opt. Lett. 38(22), 4781-4784 (2013). In such a configuration the output of a CW laser is divided into two arms by an optical splitter. The RF signal under test is transferred onto the optical domain as sidebands of the CW light in the first arm, which is then combined optically with the optical signal in the second arm whose optical frequency is altered by an optical frequency shifter. When the optical frequency of the second arm is scanned through one of the sidebands in the first arm, serial segments of the RF signal spectrum are sliced from the optical domain through optical-to-electrical down-conversion for high-resolution detection.

One of the main limitations of the TDM-based system is the acquisition time. In broadband applications, the scanning speed of the CW laser frequency is restricted not only by the requirement for high-resolution detection, which determines the dwell time, but also by the ratio between the signal bandwidth to the bandwidth of the OEC & ADC modules, which determines the number of required frequency shifts from the optical frequency shifter.

Figure 2:
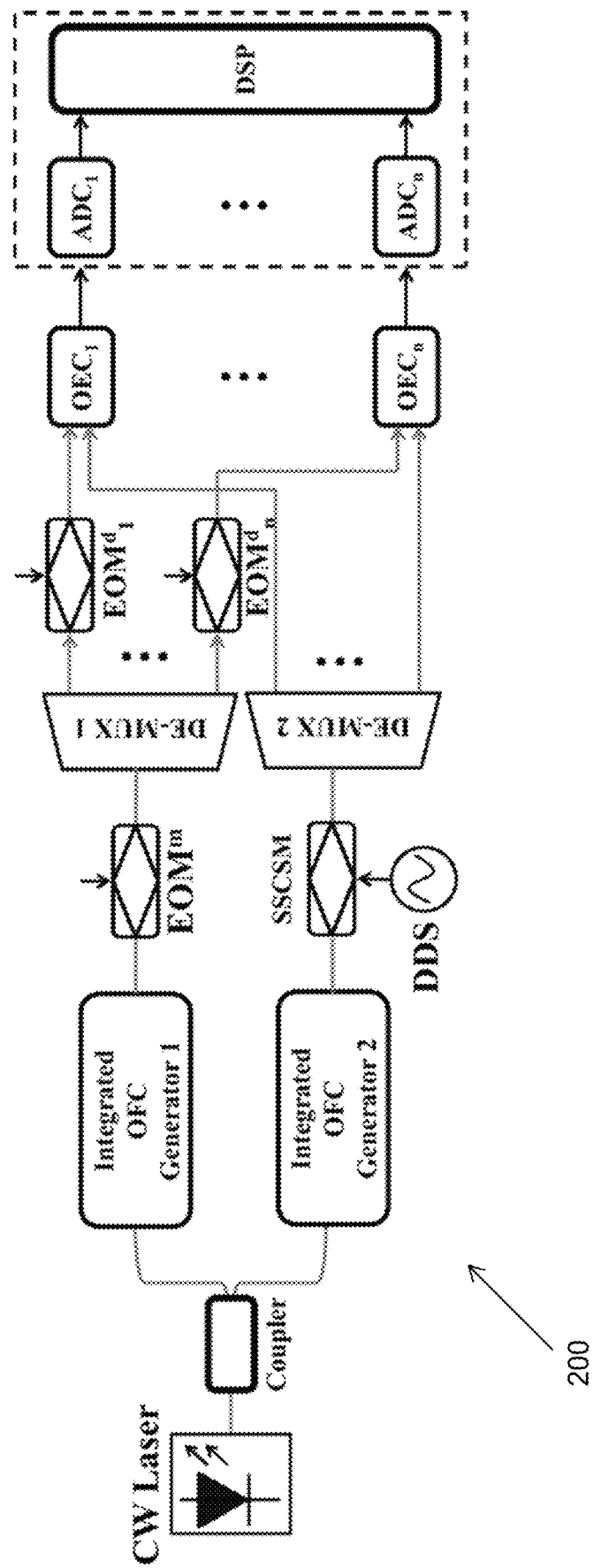
FIG. 2 shows an embodiment of an integrated photonic microwave transceiver system based on wavelength-division-multiplexing (WDM).

In the present disclosure, examples of integrated photonic microwave systems that overcome some or all of the above-mentioned limitations of the foregoing are described.
Example RF Receivers, Transmitters, and Transceivers The present disclosure relates generally to an integrated photonics system that utilizes wavelength-division multiplexing or a combination of wavelength-division and time-division multiplexing. An example embodiment of the photonics system 200 is shown in FIG. 2. In the following, the photonics system may be generally referred to for convenience as a transceiver, although in various embodiments, the system can be configured as a receiver (or analyzer), as a transmitter (e.g., an RF generator or encoder), or as both a receiver and a transmitter. Embodiments of the photonics system can be configured to receive and/or transmit microwaves.

In the embodiment shown in FIG. 2, the output of a single longitudinal mode CW laser is split into two parts by an optical coupler, generating a 1st output and a 2nd output. The first output is then converted to a first optical frequency comb (OFC1) through an integrated optical device such as a micro-resonator, or an integrated electro-optical modulator (EOM). The first comb OFC1 is shown as the upper branch in FIG. 2. The comb spacing $f_r$ of the generated optical frequency comb OFC1 is thus determined by the free-spectral-range (FSR) of the micro-resonator or by the RF frequency applied to the integrated EOM.

The comb OFC1 is further modulated by a down-stream EOM (denoted EOM$^m$), which can be, for example, a Mach-Zehnder modulator (MZM), a phase modulator, or a single-sideband carrier-suppressed modulator (SSCSM). The EOM$^m$ can be driven by the RF signal under test (e.g., a received RF signal or an RF signal to be broadcast), as shown by the arrow directed toward EOM$^m$ in FIG. 2. In this way, optical sidebands, which contain the full information of the RF signal driving the modulator, can be generated. Further details of the operation of embodiments of the microwave photonic system 200 of FIG. 2 as a multi-band RF transmitter/encoder or as a receiver/analyzer are described with reference to FIGS. 3a-4b.

The second output of the CW laser can be transformed into a second optical frequency comb (OFC2) by the same or similar mechanism that is adopted in the comb OFC1 and is shown as the lower branch in FIG. 2. The comb OFC2 has a detuned comb spacing compared with that of OFC1, denoted as $f_r+\Delta f$. Output from the comb OFC2 is subsequently passed through an optical frequency shifter (OFS), which can for example comprise a single-sideband carrier-suppressed electro-optical modulator (SSCSM) and a direct digital synthesizer (DDS). Within its modulation bandwidth, the SSCSM shifts the frequency of the optical signal passing through it by an amount that is determined by the instantaneous frequency of the driving signal generated by the DDS.

The modulated OFC1 comb output passes through a wavelength de-multiplexer (DE-MUX 1), in which the optical spectrum is segmented into n channels, each with a unique spectral allocation. The optical spectrum of the comb OFC2 is also sliced by a wavelength de-multiplexer (DE-MUX 2) with the same spectral allocation.

An electro-optical modulator (denoted EOM$^d$) can be placed in each of the n wavelength channels of the DE-MUX 1. Depending on the type of the EOM, amplitude and/or phase modulation can be achieved independently for all n wavelength channels of DE-MUX 1.

With further reference to FIG. 2, the corresponding wavelength channels of DE-MUX1 and DE-MUX2 having the same spectral allocation are coupled into n optical-to-electrical converters (OEC), e.g., an optical coupler followed by a photodetector, or a 90-degree optical hybrid followed by two balanced photodetectors. Optionally, when the system is configured as a broadband spectral analyzer/receiver, an analog-to-digital convertor (ADC) can be installed downstream of the OEC for each wavelength channel. The digital data streams from the n channels are fed into a digital signal processor (DSP) for further data analysis. In some embodiments, each ADC comprises at least one I/Q detection system. The I/Q detection system can comprise an optical hybrid.

Figure 3A:
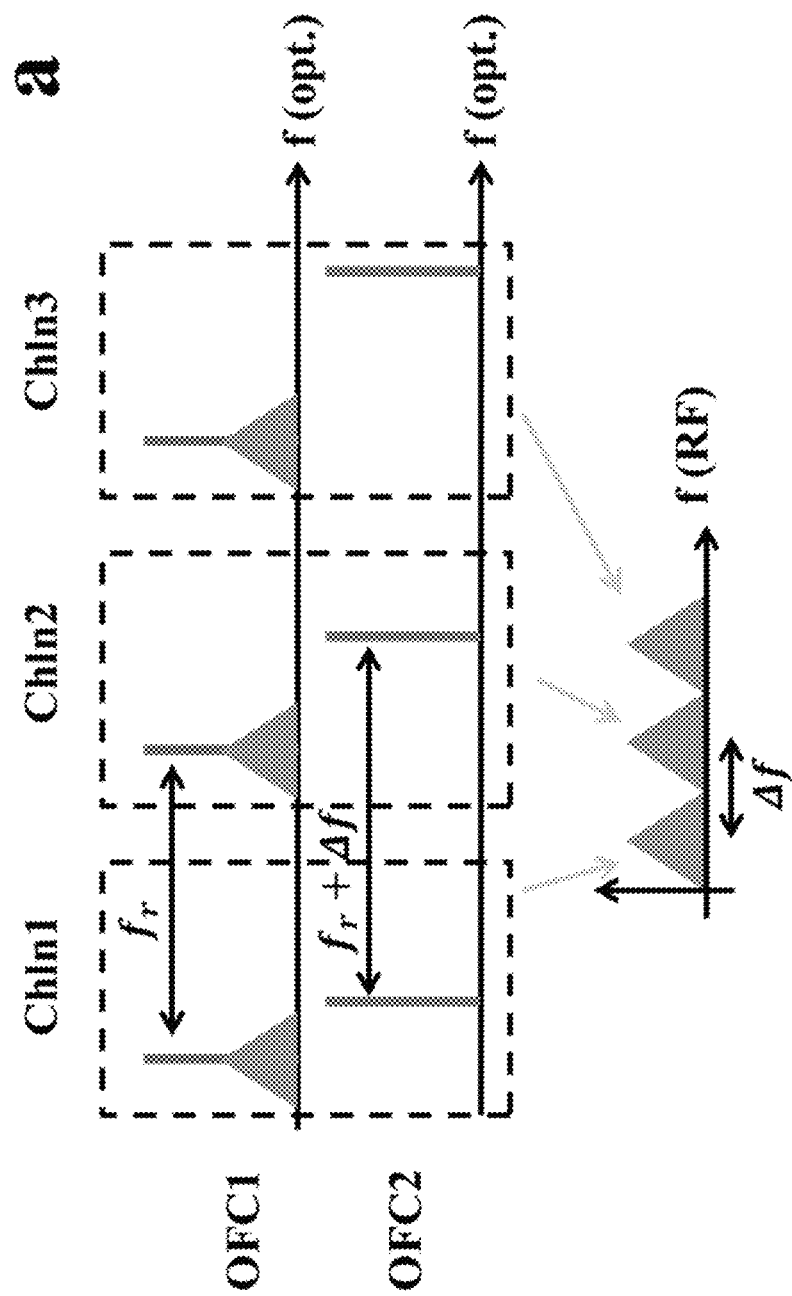
FIG. 3a demonstrates the working principle of an embodiment of the transceiver system configured as a multiband broadcaster.
Figure 3B:
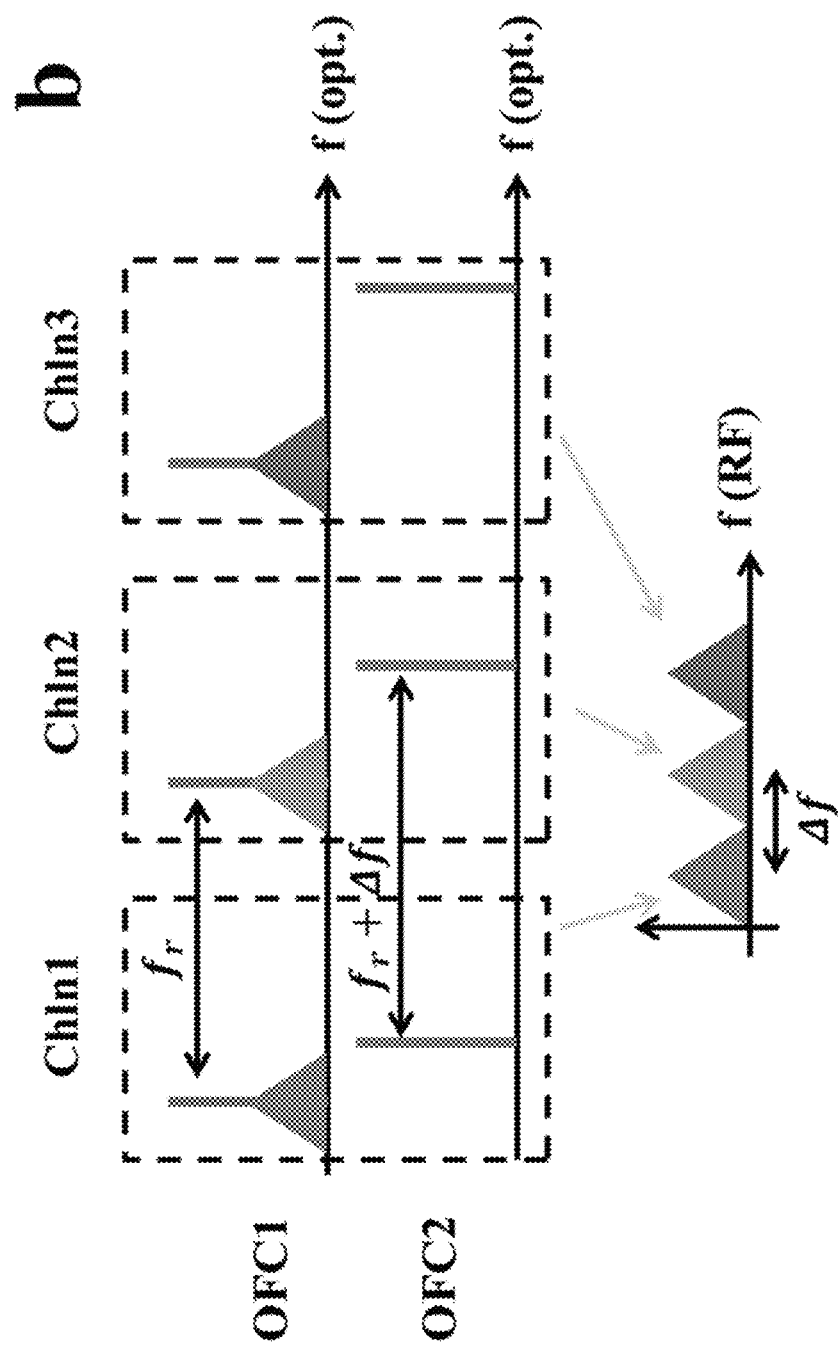
FIG. 3b demonstrates the working principle of an embodiment of the transceiver system configured as a multi-carrier encoder.

Without intending to be bound or limited by any principle or theory, the working principle of an embodiment of the microwave photonic system configured as a microwave broadband transmitter, e.g., configured as a broadband broadcaster or a multi-band encoder, is shown in FIGS. 3a and 3b, respectively. When the system is operated as a multi-band transmitter/broadcaster (FIG. 3a), the information (depicted by the triangular pedestals below the individual comb lines of OFC1 in each of the wavelength channels (Chln)) is modulated onto all the comb lines of OFC1 by $EOM^m$, while all or some of the $EOM^d$s can be set in the "all-pass" mode by removing the driving signal and biasing at the maximum transmission point. After photodetection, the same piece of information is replicated to n RF carriers separated by $\Delta f$, as illustrated in the bottom of FIG. 3a (the three triangles with separation $\Delta f$ between respective peaks of the triangles).

When the system is operated as a multi-band encoder (FIG. 3b), the $EOM^m$ can be set in the "all-pass" mode while n independent data streams are modulated to the n comb lines of OFC1 through the $EOM^d$s (e.g., the information is shown as the triangles below the OFC1 comb lines for channels Chln1, Chln2, and Chln3, respectively, and each of the triangles may represent different information in each of the channels). After optical-to-electrical (O/E) conversion, these data streams are encoded onto different RF carriers separated by $\Delta f$, as depicted in the bottom of FIG. 3b. Note that in contrast to FIG. 3a, the information on the different RF carriers separated by $\Delta f$ can (but need not) be all different (as represented by the different shadings, from left to right, of the triangles illustrated at the bottom of FIG. 3b). In both cases, the bandwidth information that can be broadcasted/encoded is restricted by the comb spacing difference $\Delta f$. Further, the generated RF spectrum can be shifted uniformly by a frequency of $\delta f$ through programming the DDS in the OFS with that same frequency.

Note that in this configuration the maximum carrier frequency that can be generated is limited by the bandwidth of the electro-optic modulators, which is about 100 GHz for current state of the art EOMs. However, by configuring the OECs such that they receive not overlapping wavelength channels but non-overlapping wavelength channels (optical wavelength channels with different frequency coverages), the carrier frequency can be increased to beyond 100 GHz. Such a system can be configured both as a broadcaster and a multiband encoder. A specific implementation is not separately shown.

Figure 4A:
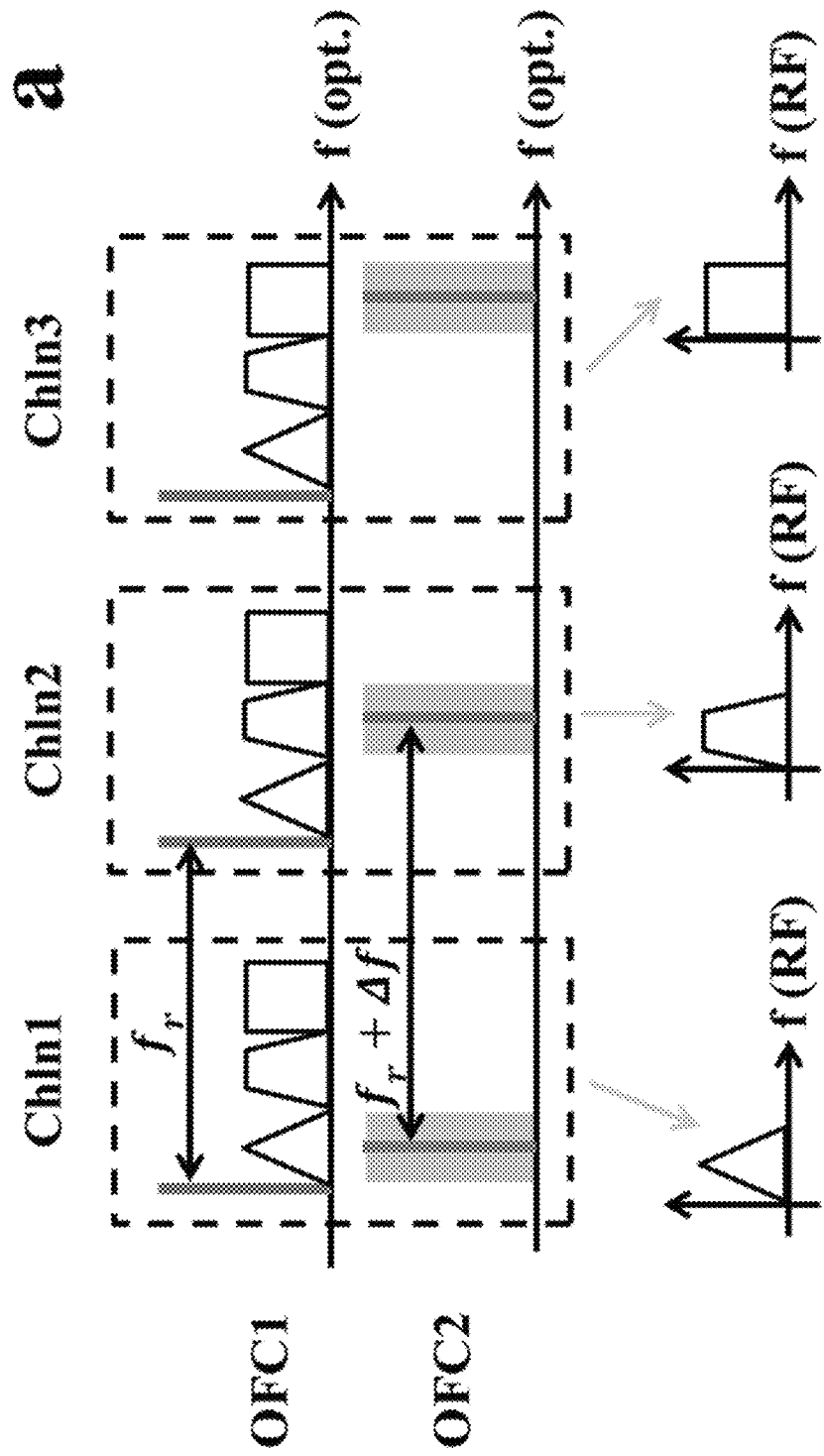
FIG. 4a shows the working principle of an embodiment of the transceiver system configured as a WDM-only spectral analyzer/receiver.
Figure 4B:
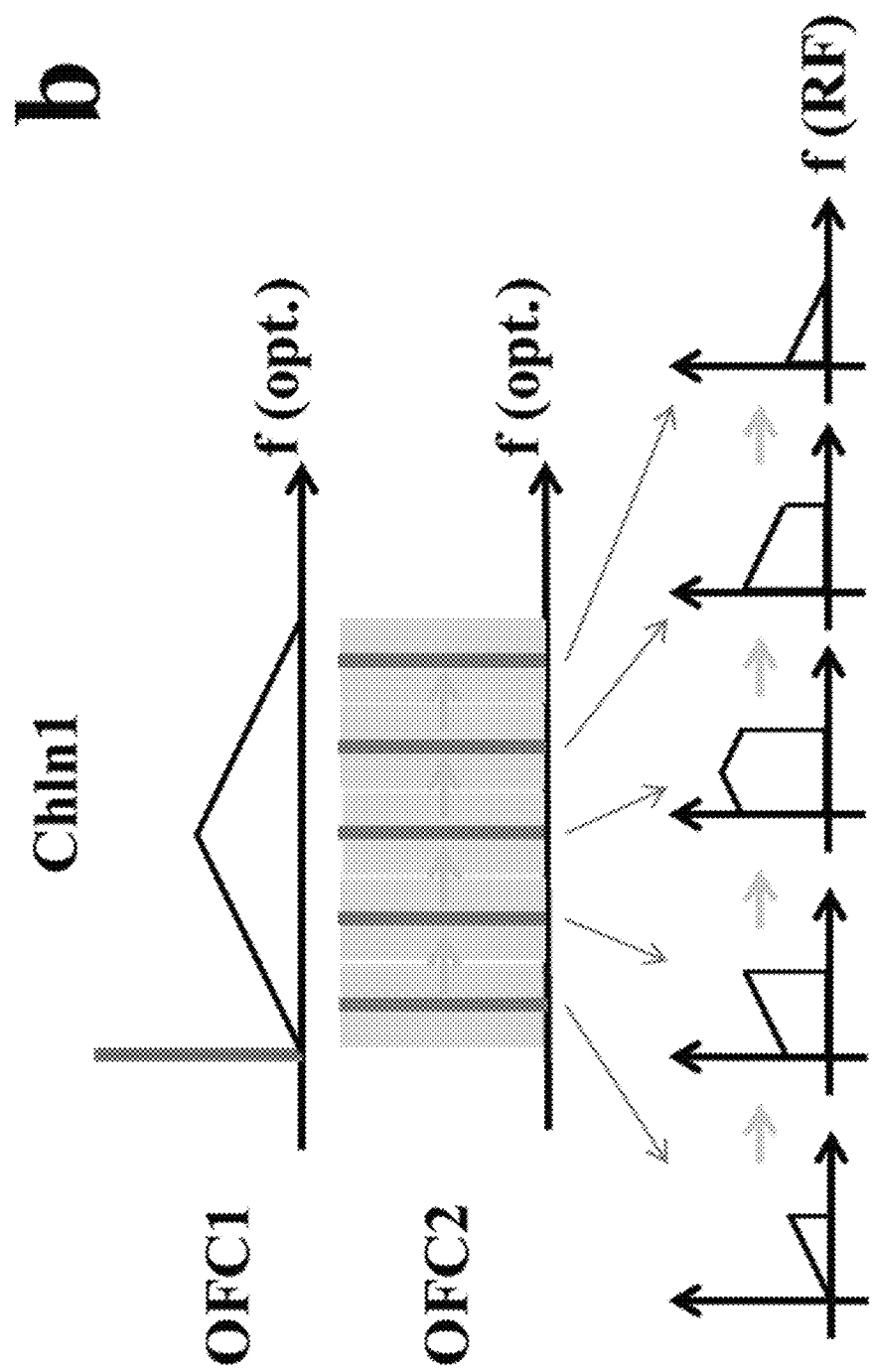
FIG. 4b shows the working principle of an embodiment of the microwave photonics system configured as a spectral analyzer/receiver employing both WDM and time-division-multiplexing (TDM).

Again, without intending to be bound or limited by any principle or theory, FIGS. 4a and 4b demonstrate a working principle of an embodiment of the microwave photonics system configured as a broadband spectral analyzer/receiver. The input signal under test (e.g., the triangular or flat topped features in FIG. 4a) is modulated to all comb lines of OFC1 through $EOM^m$. For simplicity, the $EOM^m$ is assumed to be an SSCSM in FIG. 4a. The comb lines of OFC2, together with the detection module whose detection bandwidth ($BW_d$) is marked by the gray rectangle around the individual comb lines of OFC2, serve as a "probe" to down-convert the corresponding partition of the input spectrum to near direct current (DC) (as shown in the bottom of FIG. 4a) for subsequent spectral analysis in the DSP unit. In the system, due to the detuned comb spacings, neighboring wavelength channels detect input spectral regions that are separated by $\Delta f$. In a WDM-only configuration, the comb spacing separation $\Delta f$ and the detection bandwidth $BW_d$ advantageously should match each other to cover the frequency range of interest seamlessly, as shown in FIG. 4a. In this example, the spectral resolution solely depends on the total acquisition time. For example, if the acquisition time is 1 μs, the spectral resolution is approximately 1 MHz. In the case when the detection bandwidth $BW_d$ is not as wide as the comb spacing difference $\Delta f$, time-division multiplexing (TDM) can be applied via an optical frequency shifter to cover the full input signal bandwidth. In an example embodiment, the detection bandwidth $BW_d$ can be approximately expressed as $BW_d = \Delta f/k$, where k is an integer. Instead of a constant frequency output, the frequency shifter can shift the frequency of the comb OFC2 in a sufficient number of increments to cover (e.g., allowing analysis of) the whole input signal bandwidth with a reduced detection bandwidth $BW_d$. Such a frequency shifter can for example be based on a frequency-shifting delay line (FSDL) that can be located upstream or downstream of OFC1 or OFC2. Such a frequency shifting delay line shifts the frequency of an input signal by a fixed amount (e.g., determined by an external RF modulation frequency applied to the FSDL) during the round-trip time of the delay line. The FSDL can comprise an acousto-optic frequency shifter or an electro-optic frequency shifter in various embodiments. Thus assuming that there are k round trips through the delay line, the bandwidth $BW_d$ needed to cover the whole signal bandwidth is reduced to $BW_d = \Delta f/k$.

A flexible example of a frequency shifter can be based on a direct digital synthesizer (DDS). The DDS can be programmed to output a driving signal whose instantaneous frequency is step-wise and monotonously changed by fixed increments in k steps before returning to the original state. In this way, a spectral range of $\Delta f$ can be fully covered after k steps, as illustrated in the example shown in FIG. 4b (where k=5 and where the input signal is depicted as a triangle in channel #1 of OFC1 and the k=5 portions of the output are shown at the bottom of FIG. 4b). Notice that although only channel #1 is depicted here (Chln1), the frequency shift can be uniformly applied to all comb lines of OFC2 by the OFS, consequently TDM can be implemented to all detection channels simultaneously. The spectral resolution and scan time in this case are determined by the dwell/acquisition time at each step. For instance, if the dwell/acquisition time is 1 μs for each step and 10 steps are required, the spectral resolution is approximately 1 MHz and the total scan speed is roughly 10 μs. In both WDM-only and WDM+TDM cases, the maximum frequency coverage of the analyzer/receiver may be limited by both the $EOM^m$ and the comb spacing of the two OFCs (here we assume $\Delta f \ll f_r$). Assuming $EOM^m$ has enough modulation bandwidth, if it generates only a single sideband, the maximum frequency coverage equals the comb spacing. Otherwise, it only covers half of the comb spacing due to the Nyquist ambiguity.

Figure 5:
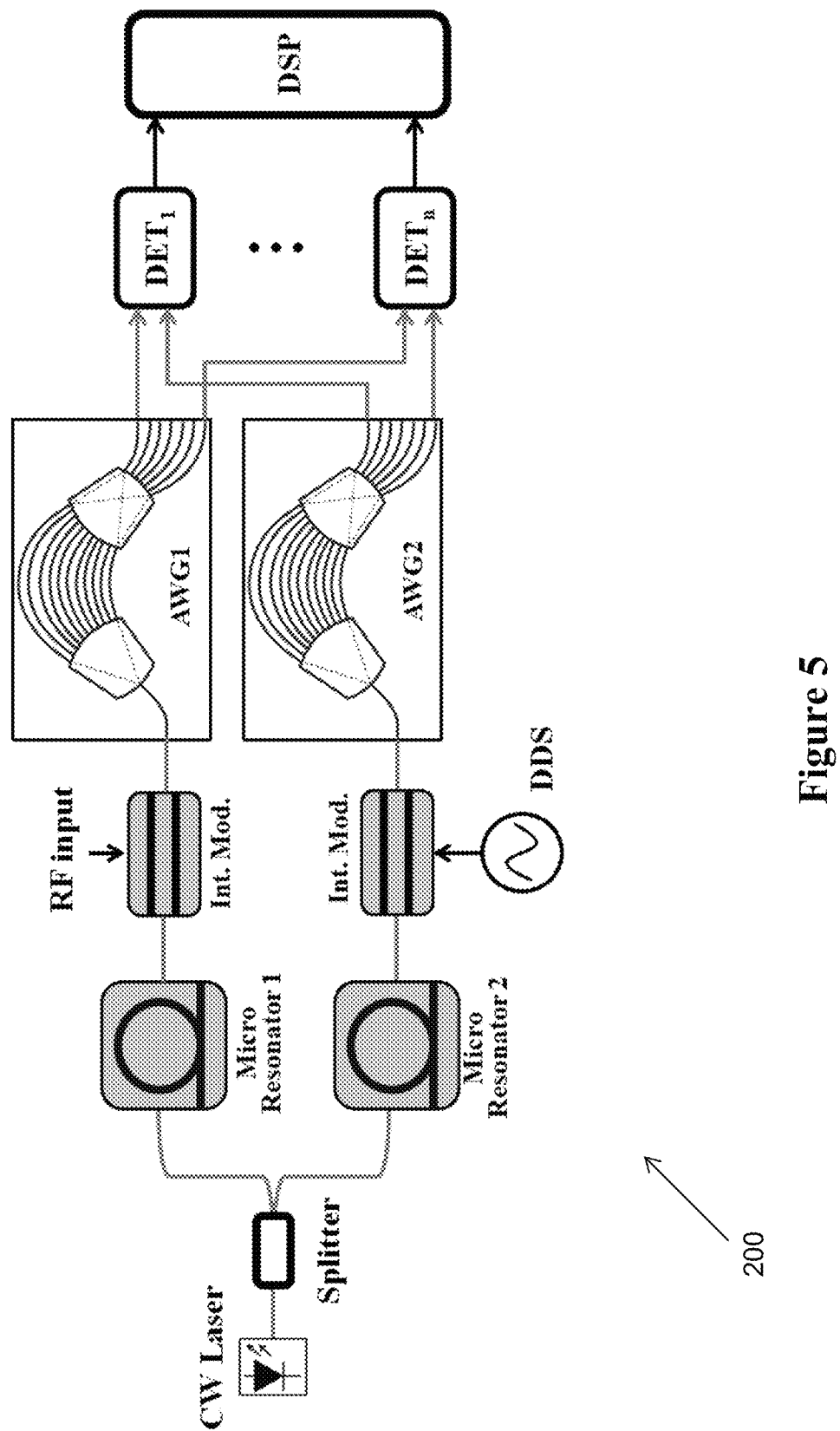
FIG. 5 shows an embodiment of an integrated photonic microwave receiver system.

FIG. 5 depicts an example embodiment of the photonics system 200 configured as a photonic microwave broadband spectral analyzer/receiver. The output from a CW laser is split in two with a splitter/coupler and coupled into two micro-resonators, MR1 and MR2. With appropriate control (e.g., temperature control, not shown) of the micro-resonators and the CW laser, two broadband low noise frequency combs are generated inside the micro-resonators. By appropriate design of the resonator length, the two optical frequency combs can be configured to have slightly detuned comb spacings (e.g., Δf=1 GHz). Such micro-resonators were recently demonstrated utilizing two high-Q silicon nitride ($Si_3N_4$) micro-resonators, as discussed in P. Marin-Palomo et al., "Microresonator-based solitons for massively parallel coherent optical communications", Nature 546, 274-279 (8 Jun. 2017). Such micro-resonators are capable of generating more than 50 comb lines within 3-dB power variation with a comb-spacing of 100 GHz. A wideband silicon-organic hybrid (SOH) modulator, as described in L. Alloatti et al., "100 GHz silicon-organic hybrid modulator", Light: Science & Applications (2014) 3, e173, can be located down stream of MR1 (shown as an integrated modulator Int. Mod. in FIG. 5) to receive the input RF signal and transform it into the optical domain as the sidebands of the comb lines of MR1. Downstream of MR2, another modulator configured as an optical frequency shifter can be optionally included. Preferably the optional frequency shifter is also configured as a single-side band modulator, though this is not a requirement.

The two outputs directly traceable to the two micro-resonators are fed separately into two wavelength division multiplexers (WDMs), for example configured as integrated array waveguide gratings (AWG1 and AWG2 in FIG. 5). Such devices were for example demonstrated in S. Cheung et al., "Low-loss and high contrast silicon-on-insulator (SOI) arrayed waveguide grating", in Proc. Conf. Lasers Electro-Opt., 2012, pp. 1-2. In an example embodiment, 50 channels with WDM channel spacing of 100 GHz can be selected. The wavelength channels of both WDMs having the same frequency coverage are combined, followed by I/Q detection modules $DET_1$ to $DET_n$ (e.g., comprising both OECs and ADCs, and/or optionally an optical hybrid) with an analog bandwidth of >1 GHz. From the information obtained from the detection modules, the full amplitude and/or phase spectrum of the input RF signal can be recovered via the shown DSP unit. Various embodiments can analyze broadband microwave signals with a bandwidth up to about 100 GHz.

With the use of an additional scanning frequency shifter, the required analog acquisition bandwidths of the detection modules can be reduced, which can greatly reduce the overall cost of the system. For example when employing k=10 steps to cover the 1 GHz microwave bandwidth present in each WDM channel, the required analog acquisition bandwidth to recover the full amplitude and/or phase spectrum of the input RF signal can be reduced to 1/k GHz=100 MHz.

To realize the functionality of a transceiver, the building blocks of the previously described broadband transmitter and receiver can be combined, as shown in an the transceiver 600 described with reference to FIG. 6, in which the same integrated coherent dual optical frequency comb generator serves as the source for both the transmitter 610 and the receiver 620. Multi-carrier RF transmitting and receiving can be achieved simultaneously based on the aforementioned operating principles. On the transmitter end, depending on the operation mode (multi-band encoder vs. broadcaster), either the $EOM^m$ or the $EOM^d$s are set in the "all-pass" mode while the other(s) transform the input RF information onto the optical carriers (see, e.g., description with reference to FIGS. 3a and 3b).

Figure 6:
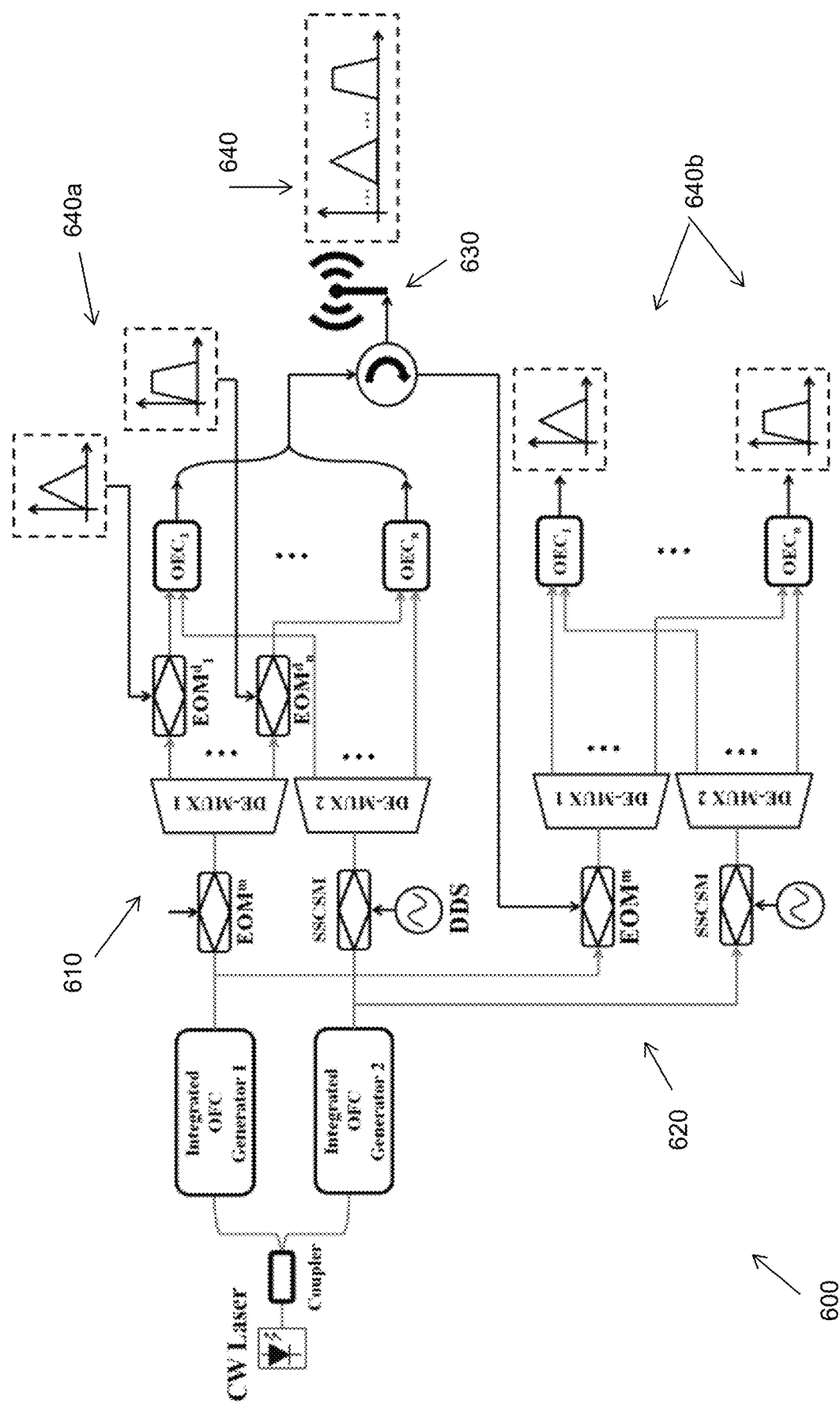
FIG. 6 demonstrates an embodiment of an integrated photonic microwave transceiver system.

FIG. 6 illustrates the situation where the transmitter 610 is set in the multi-band encoder mode. The RF information to be encoded (shown as the triangular or flat-top inputs 640a at the top right) drives the $EOM^d$s. The OFS (depicted as DDS) can be optionally operated to uniformly shift the frequencies of the generated multiple RF carriers by providing a constant frequency offset to all the comb lines of OFC2. An antenna 630 can broadcast an RF signal 640.

On the receiver end 620, a broadband RF signal 640 received by the antenna 630 is modulated into the optical domain as the sidebands of the comb lines of OFC1. The received RF signal drives $EOM^m$. All the $EOM^d$s after the DE-MUX1 are set in the "all-pass" mode (thus are not shown in the receiver end 620 of FIG. 6, since in the all-pass mode no modulation is performed by the EOM). The OFS (depicted as SSCSM upstream of DEMUX 2 on the bottom of FIG. 6) can be optionally operated to incorporate TDM by moving all the comb lines of OFC2 by a fixed increment in a step-wise way. The full broadband input signal 640 can be retrieved by analyzing and re-combining the outputs of all the individual RF channels 640b as shown on the right side of the receiver end 620 of FIG. 6.

Figure 7:
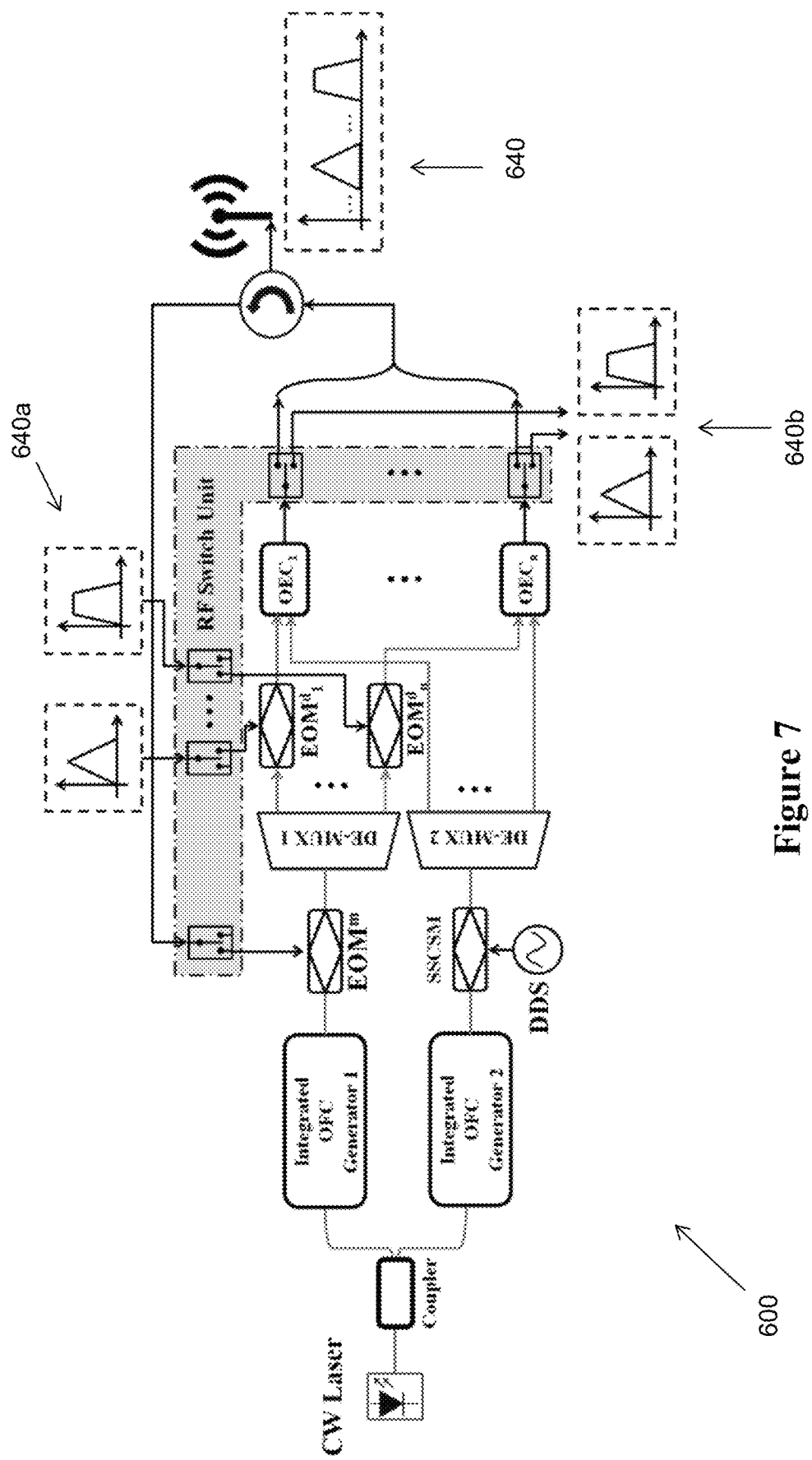
FIG. 7 demonstrates an embodiment of an integrated photonic microwave alternating transceiver system.

In another embodiment, a transceiver 600 can be achieved using one building block, if operated in an alternating mode between transmitter and receiver, as illustrated in FIG. 7. Here an RF switch unit can be installed to switch the system between the "transmitter" mode, in which depending on the setup, the data stream(s) is either encoded onto the generated multiple RF carriers by the $EOM^m$ or the $EOM^d$s, and the "receiver" mode, in which all $EOM^d$s are in "all-pass" mode and the received RF signal is fed into the transceiver through $EOM^m$ for further processing.

Figure 8A:
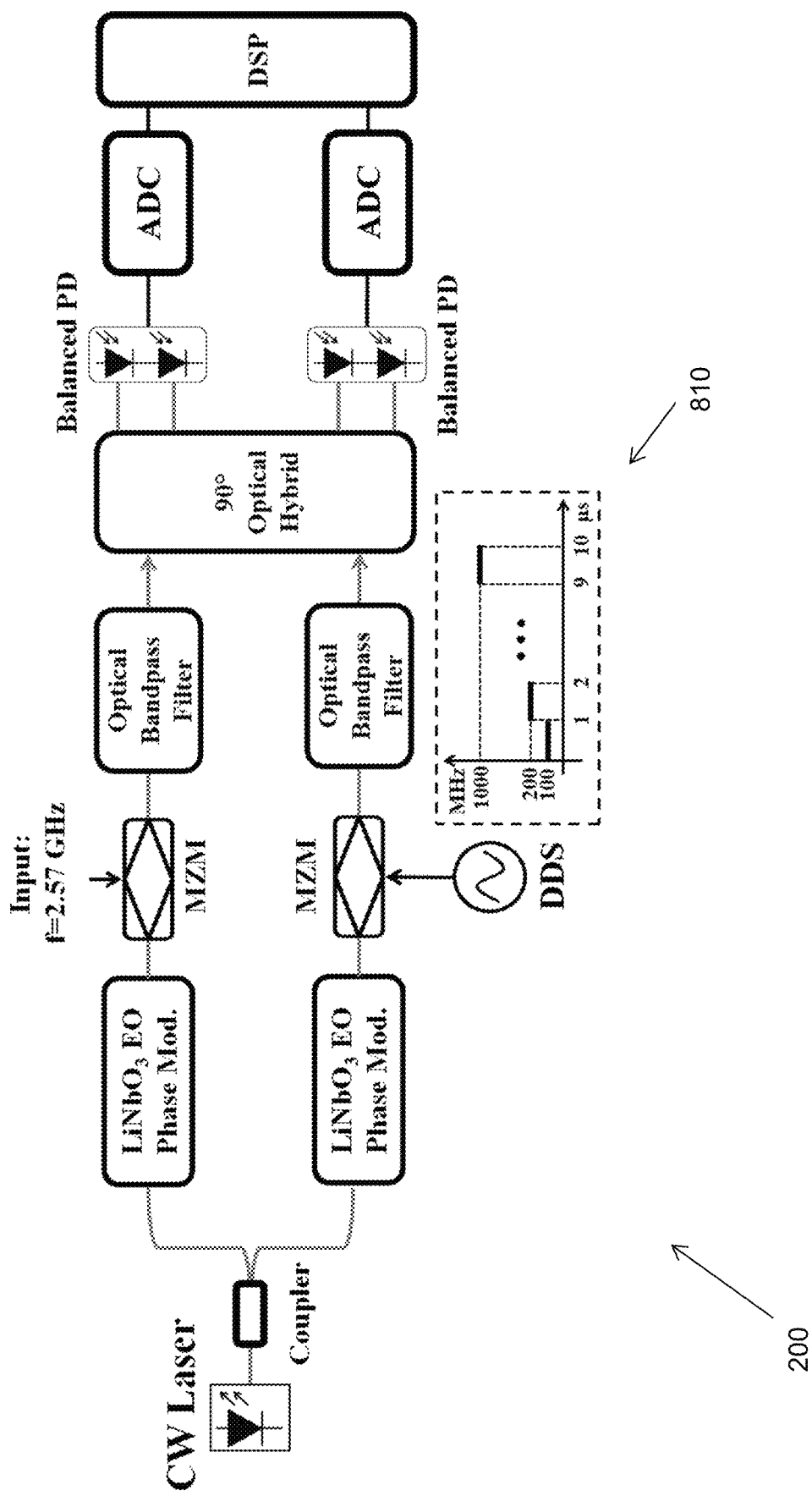
FIG. 8a shows an example of an experimental setup of a broadband RF analyzer.
Figure 8B:
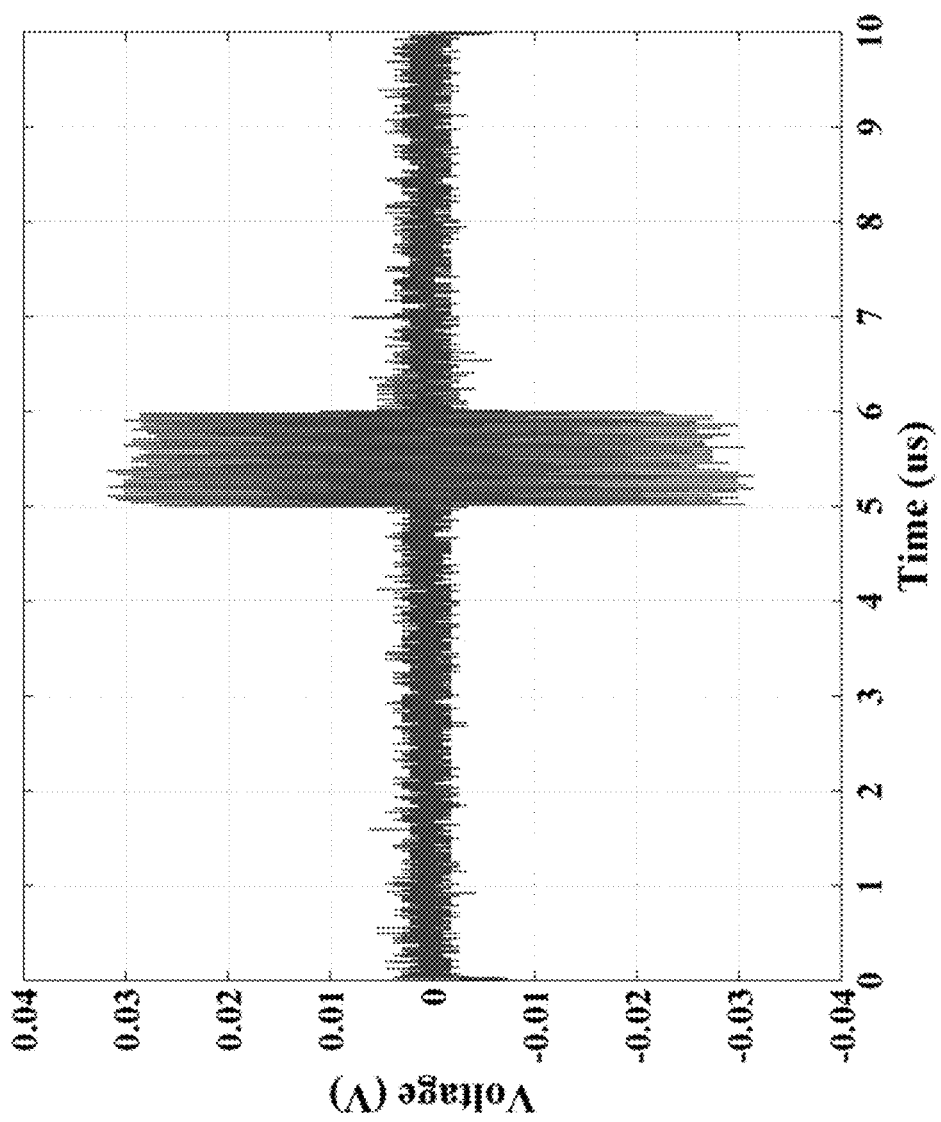
Figure 8C:
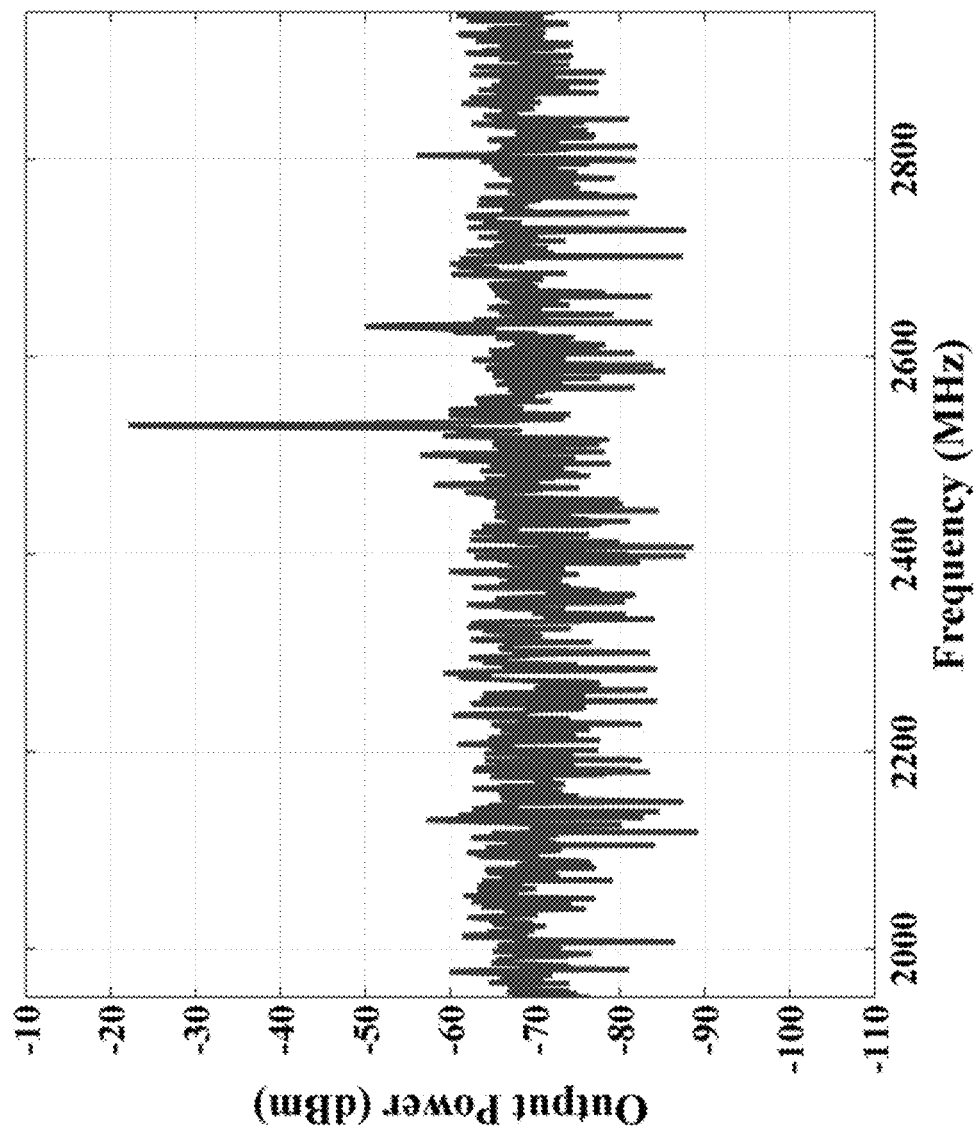

FIG. 8a shows a working example of another embodiment of the microwave photonics system 200 configured as a broadband spectral analyzer. In the example, the comb spacings of OFC1 ($f_r$) and OFC2 ($f_r$+Δf) are 16 GHz and 18 GHz, respectively. The corresponding comb detuning is thus Δf=2 GHz. In this example the combs were generated using fiber optics, e.g., via the use of fiber coupled electro-optic phase and amplitude modulators (e.g., lithium niobate $LiNbO_3$) inserted down-stream of a fiber coupled CW laser. The optical frequency shifter was based on a fiber coupled electro-optic modulator. The DDS is programmed to generate a driving signal whose frequency increases from 100 MHz to 1 GHz by 100 MHz for every 1 μs as shown in the inset 810. For experimental simplicity, two tunable optical filters were used as the wavelength de-multiplexer and only the second WDM channel (Δf to 2Δf) was monitored by an I-Q detection module with a bandwidth of 100 MHz, thus enabling detection of signals with frequencies in a range from −50 MHz to +50 MHz. For illustration purposes, a single-tone RF signal at 2.57 GHz is fed into the system through the $EOM^m$, which is an MZM in this example. Based on the principle described previously, between measurement time 5-6 μs, comb line of OFC2 in Channel 2 are located 2.6 GHz away from that of OFC1. Correspondingly, the signal under test should be down-converted to −30 MHz. As shown in FIG. 8b where only the I-channel is plotted, a signal oscillating at 30 MHz is detected from 5 to 6 μs. When all ten 1 μs TDM segments were processed and stitched together spectrally, the input signal is recovered, as shown in FIG. 8c, which shows the RF power spectrum obtained from the current spectral analyzer.

Figure 9A:
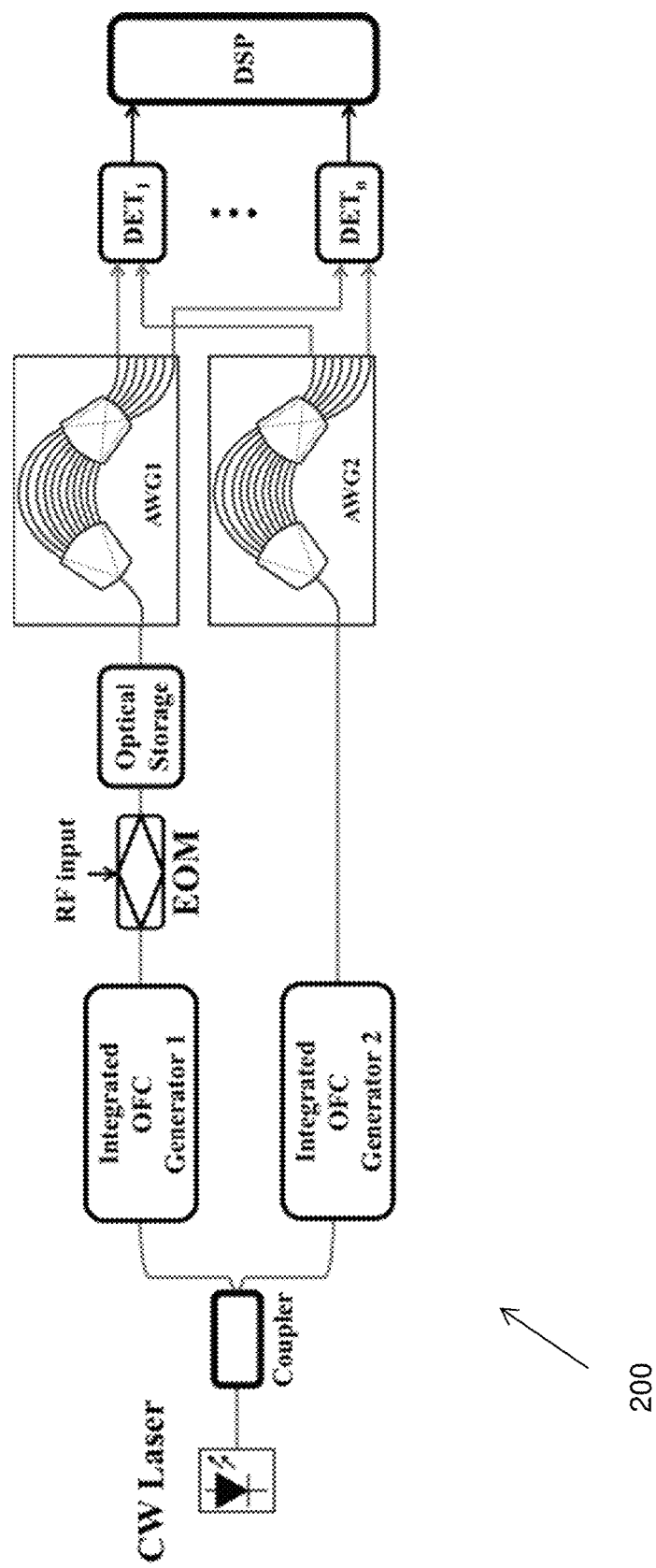
FIG. 9a shows an example of an integrated photonic microwave short-burst analyzer.

FIG. 9a shows an example of another embodiment of the microwave photonics system 200 configured as a short-burst microwave signal analyzer. In the example, a continuous-wave laser source is converted to two optical frequency combs (OFC1 and OFC2) with slightly detuned comb spacings through two integrated comb generators. A broadband electro-optic modulator (EOM) is located downstream of OFC1 to modulate an input RF signal into the optical domain as the sidebands of the comb lines of OFC1. An optical storage/frequency shifter is located either upstream or downstream of the EOM. The optical storage/frequency shifter can comprise an optical gate and a recirculating optical frequency shift delay line (FSDL). The optical gate can be for example an acousto-optic modulator or an electro-optic modulator. The optical storage/frequency shifter can be configured to detect and store short-burst microwave pulses, where the duration of the short-burst pulses is shorter than the round-trip time of optical pulses in the FSDL.

Figure 9B:
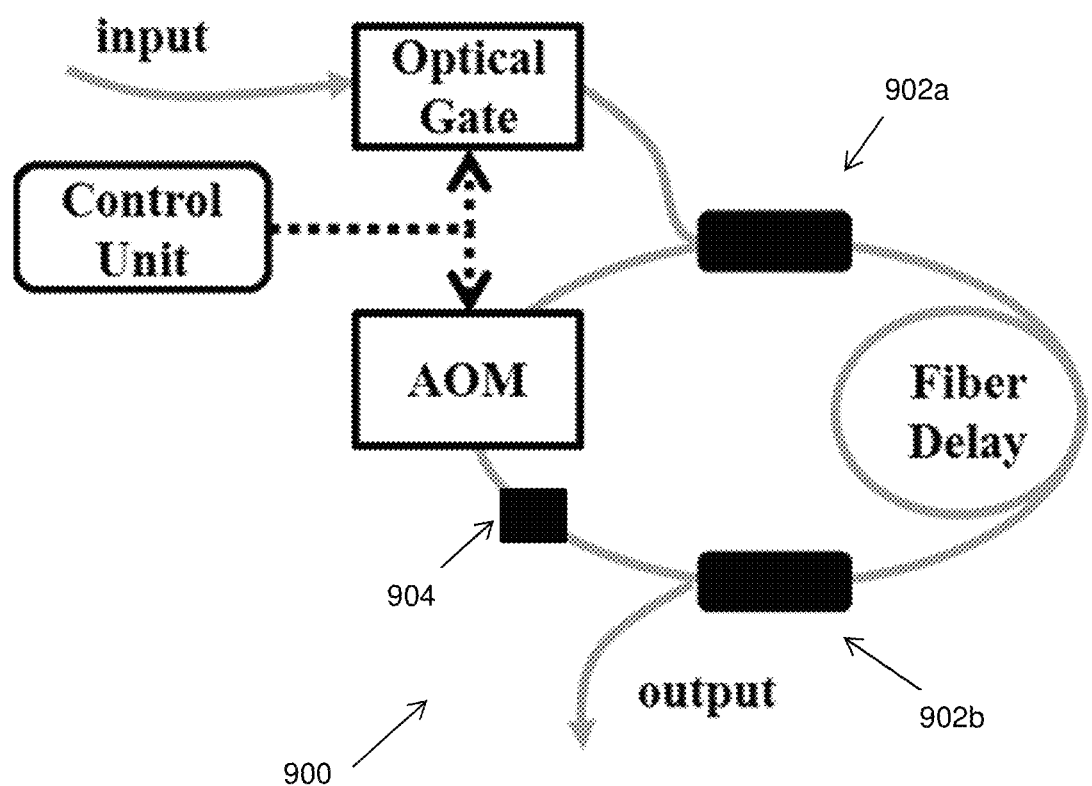
FIG. 9b shows an example of an optical storage and frequency shifter.

FIG. 9b shows an example of a recirculating optical frequency shift delay line 900. The delay line includes a first coupler 902a as input, a piece of fiber as a delay, an Erbium-doped fiber amplifier as a gain medium (the Er-doped fiber amplifier can be some or all of the delay fiber), a second coupler 902b to provide output, an optical bandpass filter 904, and an AOM for optical frequency shift. The optical gate and the AOM in the FSDL are synchronized by a control unit. The optical gate truncates the input optical signal in a periodic fashion to produce a sliced optical burst. The sliced optical burst, which contains full information of the corresponding input RF signal, recirculates in the delay line, providing a frequency shifted version of itself for every round trip. The amount of frequency shift is determined by the design of the AOM and its control unit.

With reference back to FIG. 9a, the optical signals directly traceable to the two integrated OFCs are fed into wavelength de-multiplexers, for example configured as integrated array waveguide gratings (AWG1 and AWG2 in FIG. 9a). The detection structure described with reference to FIG. 5 can be used for acquisition and signal processing. For example, the wavelength channels of both WDMs having the same frequency coverage can be combined, followed by I/Q detection modules $DET_1$ to $DET_n$ (e.g., comprising both OECs and ADCs, and/or optionally an optical hybrid) with an analog bandwidth of >1 GHz. From the information obtained from the detection modules, the full amplitude and/or phase spectrum of the input RF signal can be recovered via the shown DSP unit. The maximum temporal snapshot duration of the system can be determined by the fiber delay of the FSDL, and the maximum bandwidth coverage can be determined by the number of the WDM channels and the comb spacing mismatch.

Additional Aspects

1) A photonics system comprising: a dual comb generator, comprising a 1st comb and a 2nd comb, said 1st comb and said 2nd comb configured to operate at different repetition rates; a first wavelength division multiplexing (WDM) system configured to receive an optical input directly traceable to an output of said 1st comb, the WDM system configured to separate the optical input into a set of wavelength channels; a set of optical-to-electrical converters (OEC) configured to receive as a 1st input a signal directly traceable to an output of said WDM channels and as a 2nd input a signal directly traceable to an output of said 2nd comb, said set of OECs configured to convert their inputs to electrical signals, said dual comb generator configured in integrated optic devices, such as micro-ring resonators or integrated optic comb generators.

2) The system according to aspect 1, said dual comb generator based on silicon photonics, silica nitride, diamond microstructures or any other microstructures.

3) The system according to aspect 1 or aspect 2, said system further configured to be a component of a microwave transceiver.

4) The system according to any one of aspects 1 to 3, said system further comprising at least one continuous wave (CW) laser configured for injection into at least one of the combs of said dual comb generator.

5) The system according to any one of aspects 1 to 4, said first WDM system configured to separate at least some of the individual comb lines of said 1st comb into individual wavelength channels.

6) The system according to any one of aspects 1 to 5, further comprising an optical frequency shifter configured to frequency shift the comb lines of one of said combs.

7) The system according to any one of aspects 1 to 6, further comprising a second WDM system configured to receive an optical input and to separate the input into a set of wavelength channels, said second WDM system located down-stream from said 2nd comb.

8) The system according to aspect 7, said 1st and 2nd WDM systems configured to have substantially overlapping wavelength channels.

9) The system according to any one of aspects 1 to 8, further comprising at least one electro-optic modulator configured to receive a microwave signal and to modulate the signal onto at least one of the comb lines from said 1st comb.

10) The system according to aspect 9, said electro-optic modulator configured to modulate said microwave signal onto more than one comb line from said 1st comb.

11) The system according to any one of aspects 1 to 10, comprising more than one electro-optic modulator configured to modulate at least two different microwave signals onto more than one comb line from said 1st comb.

12) The system according to any one of aspects 1 to 11, further configured as a microwave transmitter, further comprising an antenna configured to receive as input a microwave signal directly traceable to the output of at least one of said set of OECs and configured to transmit said microwave signal as radio waves.

13) The system according to aspect 12, said set of OECs configured to receive a signal from a wavelength channel directly traceable to said 1st comb and a wavelength channel directly traceable to said 2nd comb, said two wavelength channels configured to have substantially overlapping optical bandwidths.

14) The system according to aspect 12, said set of OECs configured to receive a signal from a wavelength channel directly traceable to said 1st comb and a wavelength channel directly traceable to said 2nd comb, said two wavelength channels configured to have substantially non-overlapping optical bandwidths.

15) The system according to any one of aspects 12 to 14, configured to transmit a broadband microwave signal with a bandwidth up to 100 GHz.

16) The system according to any one of aspects 12 to 14, configured to transmit a broadband microwave signal with a bandwidth larger than 100 GHz.

17) The system according to any one of aspects 1 to 16, further configured as a microwave receiver configured to receive a microwave signal under test (SUT), the system further comprising: a set of analog to digital converters (ADC), configured to receive as input a signal directly traceable to an output of at least one of said set of OECs, said set of ADCs configured to produce a set of digitized outputs; at least one digital signal processor located downstream of said set of ADCs and configured to analyze digitized data from said set of ADCs and to produce an output representative of at least an amplitude or a phase of said SUT.

18) The system according to aspect 17, further comprising an optical frequency shifter, said optical frequency shifter configured to enable detection of the amplitude or the phase of said SUT with a detection bandwidth smaller than the bandwidth of said set of wavelength channels.

19) The system according to aspect 17 or aspect 18, where at least one of the set of ADCs comprises an I/Q detection system.

20) The system according to any one of aspects 17 to 19, configured to analyze broadband microwave signals with a bandwidth up to 100 GHz.

21) The system according to any one of aspects 1 to 20, further configured as a transceiver, said dual comb generator configured to simultaneously transmit a microwave signal and receive a microwave signal.

22) The system according to any one of aspects 1 to 21, further configured as a transceiver, said system comprising an RF switching system, said RF switching system configured to switch said dual comb generator between transmitting a microwave signal and receiving a microwave signal.

23) The system according to aspect 6 or aspect 18, said optical frequency shifter comprising a recirculating optical frequency shifting delay line (FSDL) located either upstream or downstream of one of said combs, said FSDL configured to produce at its output a frequency shifted version of its input, said frequency shift determined by an external RF modulation frequency applied to said FSDL and a number of roundtrips through said FSDL.

24) The system according to aspect 23, where said FSDL comprises an acousto-optic frequency shifter.

25) The system according to aspect 23 or aspect 24, where said FSDL comprises an electro-optic frequency shifter.

26) The system according to aspect 25, said electro-optic frequency shifter configured to produce an addressable optical frequency shift via an applied modulation signal derived from a direct digital synthesizer (DDS).

27) The system according to aspect 25 or aspect 26, said electro-optic frequency shifter configured as a single sideband modulator.

28) A microwave receiver configured to receive a microwave signal under test (SUT), the microwave receiver comprising: a dual comb generator, comprising a 1st comb and a 2nd comb, said 1st comb and said 2nd comb configured to operate at different repetition rates; at least one wavelength division multiplexing (WDM) system configured to receive an optical input directly traceable to an output of said 1st comb, and to separate the input into a set of wavelength channels, a set of optical to electrical converters (OEC) configured to receive as a first input a signal directly traceable to an output of said set of WDM channels and as a 2nd input a signal directly traceable to an output of said 2nd comb, said set of OECs configured to convert their input to electrical signals; a set of analog to digital converters (ADC), configured to receive as input a signal directly traceable to an output of at least one of said set of OECs, configured to produce a set of digitized outputs; a digital signal processor configured to receive said set of digitized outputs and to produce an output representative of at least an amplitude or a phase of said SUT; an optical frequency shifter configured to enable detection of the amplitude or the phase of said SUT with a detection bandwidth smaller than a bandwidth of said set of wavelength channels.

29) The microwave receiver according to aspect 28, where at least one of the set of ADCs comprises an I/Q detection system.

30) The system according to aspect 19 or the microwave receiver according to aspect 29, where the I/Q detection system comprises an optical hybrid.

31) A microwave photonics system configured as a short-burst microwave signal analyzer, the microwave photonics system comprising: a continuous-wave laser source; a dual-comb generator configured to convert output of the continuous-wave laser source to two optical frequency combs (OFC1 and OFC2) with slightly detuned comb spacings; a broadband electro-optic modulator (EOM) located downstream of said OFC1 to modulate an input radio frequency (RF) signal into the optical domain as the sidebands of comb lines of said OFC1; an optical storage/frequency shifter located downstream of said EOM; a first wavelength division multiplexing (WDM1) system configured to receive an optical input directly traceable to an output of said OFC1 and to provide a first set of wavelength channels; a second wavelength division multiplexing (WDM2) system configured to receive an optical input directly traceable to an output of said OFC2 and to provide a second set of wavelength channels; a set of I/Q detectors each configured to receive as a first input a first wavelength channel of said first set of wavelength channels from WDM1 and as a second input a second wavelength channel from said second set of wavelength channels from WDM2, said first wavelength channel and said second wavelength channel having substantially the same frequency coverage; and a digital signal processor configured to receive outputs from said set of I/Q detection modules and to produce an output representative of at least an amplitude or a phase of said input RF signal. At least some of the I/Q detectors can comprise an optical hybrid.

32) The microwave photonics system according to aspect 31, wherein the optical storage/frequency shifter comprises an optical gate and a recirculating optical frequency shift delay line (FSDL).

33) The microwave photonics system according to aspect 32, wherein the optical gate comprises an acousto-optic modulator or an electro-optic modulator.

34) A recirculating optical frequency shift delay line (FSDL) comprising: a first coupler as input; a piece of fiber as a delay; an Erbium-doped fiber amplifier as a gain medium; a second coupler to provide output; an optical bandpass filter; and an acousto-optic modulator (AOM) configured to shift optical frequency, in combination with an optical frequency shifter configured for detection and storage of short microwave burst pulses, where duration of said short microwave burst pulses is shorter than a round-trip time of optical pulses in said FSDL.

35) The FSDL according to aspect 34, further comprising: an optical gate; and a control unit configured to synchronize the optical gate and the AOM.

36) The FSDL according to aspect 35, wherein the optical gate is configured to truncate an input optical signal in a periodic fashion to produce a sliced optical burst that recirculates in the delay line, providing a frequency shifted version every round trip.

Any of aspects 1 to 36 can be configured as a transceiver system or as a microwave transceiver system or as a short-burst microwave signal analyzer.

Additional Considerations

Thus, the invention has been described in several embodiments. It is to be understood that the embodiments are not mutually exclusive, and elements described in connection with one embodiment may be combined with, rearranged, or eliminated from, other embodiments in suitable ways to accomplish desired design objectives. No single feature or group of features is necessary or required for each embodiment.

For purposes of summarizing the present invention, certain aspects, advantages and novel features of the present invention are described herein. It is to be understood, however, that not necessarily all such advantages may be achieved in accordance with any particular embodiment. Thus, the present invention may be embodied or carried out in a manner that achieves one or more advantages without necessarily achieving other advantages as may be taught or suggested herein.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" or "an" or "the" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A photonics system comprising:
    a dual comb generator, comprising a 1st comb and a 2nd comb, said 1st comb and said 2nd comb configured to operate at different repetition rates;
    at least one electro-optic modulator configured to receive a microwave signal and to modulate the signal onto more than one comb line from said 1st comb;
    a first wavelength division multiplexing (WDM) system configured to receive an optical input directly traceable to an output of said 1st comb, the WDM system configured to separate the optical input into a set of wavelength channels; and
    a set of optical-to-electrical converters (OEC) configured to receive as a 1st input a signal directly traceable to an output of said WDM channels and as a 2nd input a signal directly traceable to an output of said 2nd comb, said set of OECs configured to convert their inputs to electrical signals,
    said dual comb generator configured in an integrated optic device.

2. The system according to claim 1, said dual comb generator based on silicon photonics, silica nitride, diamond microstructures or any other microstructures.

3. The system according to claim 1, said system further configured to be a component of a microwave transceiver.

4. The system according to claim 1, said system further comprising at least one continuous wave (CW) laser configured for injection into at least one of the combs of said dual comb generator.

5. The system according to claim 1, said first WDM system configured to separate at least some of the individual comb lines of said 1st comb into individual wavelength channels.

6. The system according to claim 1, further comprising an optical frequency shifter configured to frequency shift the comb lines of one of said combs.

7. The system according to claim 1, further comprising a second WDM system configured to receive an optical input and to separate the input into a set of wavelength channels, said second WDM system located down-stream from said 2nd comb.

8. The system according to claim 7, said 1st and 2nd WDM systems configured to have substantially overlapping wavelength channels.

9. The system according to claim 1, comprising more than one electro-optic modulator configured to modulate at least two different microwave signals onto more than one comb line from said 1st comb.

10. The system according to claim 1, further configured as a microwave receiver configured to receive a microwave signal under test (SUT), the system further comprising:
    a set of analog to digital converters (ADC), configured to receive as input a signal directly traceable to an output of at least one of said set of OECs, said set of ADCs configured to produce a set of digitized outputs; and
    at least one digital signal processor located downstream of said set of ADCs and configured to analyze digitized data from said set of ADCs and to produce an output representative of at least an amplitude or a phase of said SUT.

11. The system according to claim 10, further comprising an optical frequency shifter, said optical frequency shifter configured to enable detection of the amplitude or the phase of said SUT with a detection bandwidth smaller than the bandwidth of said set of wavelength channels.

12. The system according to claim 10, where at least one of the set of ADCs comprises an I/Q detection system.

13. The system according to claim 10, configured to analyze broadband microwave signals with a bandwidth up to 100 GHz.

14. The system according to claim 1, further configured as a transceiver, said dual comb generator configured to simultaneously transmit a microwave signal and receive a microwave signal.

15. The system according to claim 1, wherein the integrated optic device comprises a micro-ring resonator or an integrated optic comb generator.

16. A microwave photonics system configured as a short-burst microwave signal analyzer, the microwave photonics system comprising:
- a continuous-wave laser source;
- a dual-comb generator configured to convert output of the continuous-wave laser source to two optical frequency combs (OFC1 and OFC2) with slightly detuned comb spacings;
- a broadband electro-optic modulator (EOM) located downstream of said OFC1 to modulate an input radio frequency (RF) signal into the optical domain as the sidebands of comb lines of said OFC1;
- an optical storage/frequency shifter located downstream of said EOM, the optical storage/frequency shifter comprising an optical gate and a recirculating optical frequency shift delay line (FSDL);
- a first wavelength division multiplexing (WDM1) system configured to receive an optical input directly traceable to an output of said OFC1 and to provide a first set of wavelength channels;
- a second wavelength division multiplexing (WDM2) system configured to receive an optical input directly traceable to an output of said OFC2 and to provide a second set of wavelength channels;
- a set of I/Q detectors each configured to receive as a first input a first wavelength channel of said first set of wavelength channels from WDM1 and as a second input a second wavelength channel from said second set of wavelength channels from WDM2, said first wavelength channel and said second wavelength channel having substantially the same frequency coverage; and
- a digital signal processor configured to receive outputs from said set of I/Q detectors and to produce an output representative of at least an amplitude or a phase of said input RF signal.

17. The microwave photonics system according to claim 16, wherein the optical gate comprises an acousto-optic modulator or an electro-optic modulator.

18. A photonics system comprising:
- a dual comb generator, comprising a 1st comb and a 2nd comb, said 1st comb and said 2nd comb configured to operate at different repetition rates;
- a first wavelength division multiplexing (WDM) system configured to receive an optical input directly traceable to an output of said 1st comb, the WDM system configured to separate the optical input into a set of wavelength channels; and
- a set of optical-to-electrical converters (OEC) configured to receive as a 1st input a signal directly traceable to an output of said WDM channels and as a 2nd input a signal directly traceable to an output of said 2nd comb,
- said set of OECs configured to convert their inputs to electrical signals,
- said dual comb generator configured in an integrated optic device,
- said photonics system configured as a microwave transmitter, further comprising an antenna configured to receive as input a microwave signal directly traceable to the output of at least one of said set of OECs and configured to transmit said microwave signal as radio waves.

19. The system according to claim 18, said set of OECs configured to receive a signal from a wavelength channel directly traceable to said 1st comb and a wavelength channel directly traceable to said 2nd comb, said two wavelength channels configured to have substantially overlapping optical bandwidths.

20. The system according to claim 18, said set of OECs configured to receive a signal from a wavelength channel directly traceable to said 1st comb and a wavelength channel directly traceable to said 2nd comb, said two wavelength channels configured to have substantially non-overlapping optical bandwidths.

21. The system according to claim 18, configured to transmit a broadband microwave signal with a bandwidth up to 100 GHz.

22. The system according to claim 18, configured to transmit a broadband microwave signal with a bandwidth larger than 100 GHz.

23. A photonics system comprising:
- a dual comb generator, comprising a 1st comb and a 2nd comb, said 1st comb and said 2nd comb configured to operate at different repetition rates;
- a first wavelength division multiplexing (WDM) system configured to receive an optical input directly traceable to an output of said 1st comb, the WDM system configured to separate the optical input into a set of wavelength channels; and
- a set of optical-to-electrical converters (OEC) configured to receive as a 1st input a signal directly traceable to an output of said WDM channels and as a 2nd input a signal directly traceable to an output of said 2nd comb,
- said set of OECs configured to convert their inputs to electrical signals,
- said dual comb generator configured in an integrated optic device,
- the photonics system configured as a transceiver, said system comprising an RF switching system, said RF switching system configured to switch said dual comb generator between transmitting a microwave signal and receiving a microwave signal.

24. A photonics system comprising:
- a dual comb generator, comprising a 1st comb and a 2nd comb, said 1st comb and said 2nd comb configured to operate at different repetition rates;
- an optical frequency shifter configured to frequency shift the comb lines of one of said combs, said optical frequency shifter comprising a recirculating optical frequency shifting delay line (FSDL) located either upstream or downstream of one of said combs, said FSDL configured to produce at its output a frequency shifted version of its input, said frequency shift determined by an external RF modulation frequency applied to said FSDL and a number of roundtrips through said FSDL;
- a first wavelength division multiplexing (WDM) system configured to receive an optical input directly traceable to an output of said 1st comb, the WDM system configured to separate the optical input into a set of wavelength channels; and
- a set of optical-to-electrical converters (OEC) configured to receive as a 1st input a signal directly traceable to an output of said WDM channels and as a 2nd input a signal directly traceable to an output of said 2nd comb, said set of OECs configured to convert their inputs to electrical signals, said dual comb generator configured in an integrated optic device.

25. The system according to claim 24, where said FSDL comprises an acousto-optic frequency shifter.

26. The system according to claim 24, where said FSDL comprises an electro-optic frequency shifter.

27. The system according to claim 26, said electro-optic frequency shifter configured to produce an addressable optical frequency shift via an applied modulation signal derived from a direct digital synthesizer (DDS).

28. The system according to claim 26, said electro-optic frequency shifter configured as a single sideband modulator.

* * * * *